G. L. REENSTIERNA.
TOOTH CLEANING DEVICE.
APPLICATION FILED OCT. 6, 1910.

1,128,045.

Patented Feb. 9, 1915.

Witnesses:

Gustaf Libert Reenstierna, Inventor
By his Attorney
Clarkson A. Collins.

UNITED STATES PATENT OFFICE.

GUSTAF LIBERT REENSTIERNA, OF CONGERS, NEW YORK, ASSIGNOR TO CLARKSON A. COLLINS, OF NEW YORK, N. Y.

TOOTH-CLEANING DEVICE.

1,128,045.

Specification of Letters Patent.

Patented Feb. 9, 1915.

Application filed October 6, 1910. Serial No. 585,617.

*To all whom it may concern:*

Be it known that I, GUSTAF LIBERT REENSTIERNA, a citizen of the United States, residing at Congers, in the county of Rockland and State of New York, have invented a new and useful Tooth-Cleaning Device, of which the following is a specification.

My invention relates to a device for frictionally cleaning the teeth, and the object of my improvements is to provide an inexpensive, efficient and cleanly device for this purpose, which shall be convenient to use, and which shall not afford a breeding place for disease germs collected from the mouth, as is the case with the ordinary bristle tooth brush, and hence shall be sanitary in character.

The invention will be best understood by describing it in connection with the accompanying drawings, which illustrate an embodiment thereof.

Figure 1:
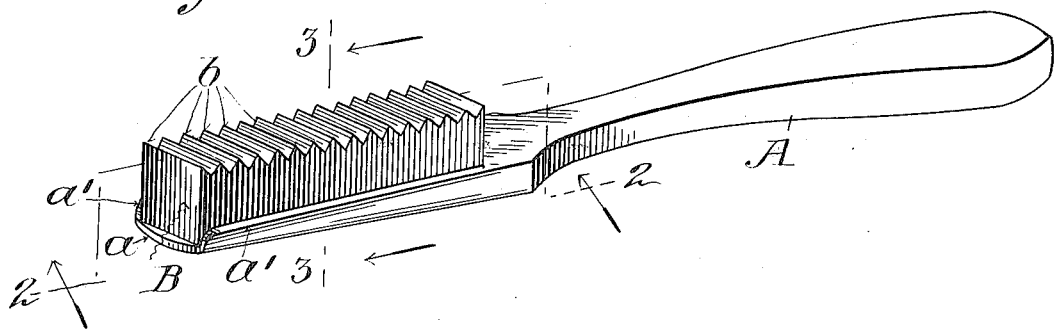
Figure 2:
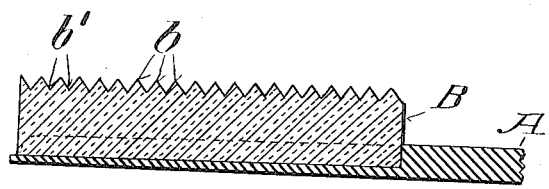
Figure 3:
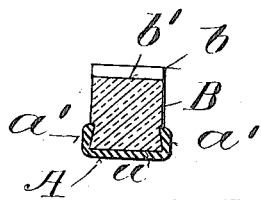
Figure 4:
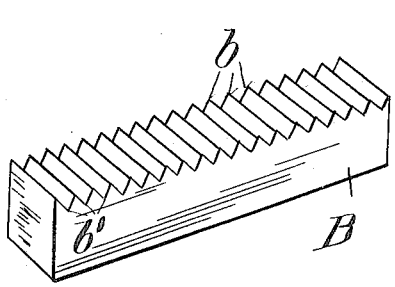
Figure 6:
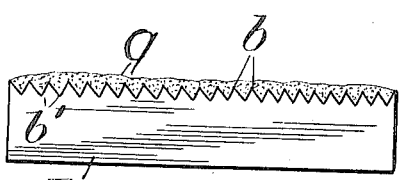
Figure 5:
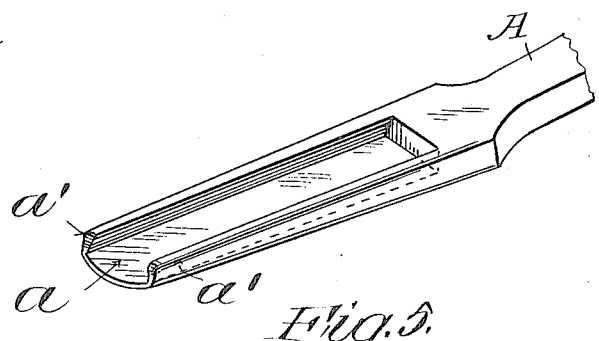

Figure 1 of the drawings shows a perspective view of the device. Fig. 2 shows a longitudinal, vertical section of the cleaning pad and end of the handle on the line 2—2, Fig. 1. Fig. 3 shows a cross section of the same on the line 3—3, Fig. 1. Fig. 4 shows a perspective view of the cleaning pad. Fig. 5 shows a perspective view of the socketed end of the handle. Fig. 6 shows a side elevation of the cleaning pad with a cleaning compound applied to the surface thereof.

Referring to the drawings, A, indicates a conveniently shaped handle provided at one end, with a longitudinally extended socket, $a$, having turned in or grooved sides, $a'$, $a'$, and adapted to receive and securely hold the cleaning pad, B.

The cleaning pad, B, is formed of suitable absorbent material, (which will readily absorb water,) such as blotting paper of rather dense quality, and is of such size as to be removably inserted in the socket, $a$, and closely held between the sides, $a'$, $a'$. Preferably, in order to insure the secure holding of the pad, B, in place, its sides are flared outwardly at the bottom, as shown in Fig. 3, so as to take under the sides, $a'$, $a'$, or set into the grooves therein.

The upper, operative, surface of the pad, B, is preferably formed in transverse ridges, $b$, $b$, with corresponding intermediate grooves. The upper ridged surface of the pad, B, is also preferably coated, if desired to such an extent as to fill the grooves between the ridges, with any suitable tooth-cleaning paste, shown at C, which is held in place by adhering to and being partially absorbed in the surface of the pad, B. This coating not only provides a convenient preparation but the paste forms a dried protective coating which prevents injury to the teeth engaging surface of the pad, and portions of which extend between the projections $b$ and prevent the breaking of the said projecting portions thereof when the pad is dry and therefore brittle. If desired also the whole of the pad, B, may be treated with any suitable antiseptic solution.

In using the device a pad, B, is inserted in the socket, $a$, of the handle, A. Upon dipping the pad in the water, it immediately swells by reason of the absorption of moisture, and is firmly held between the sides, $a'$, $a'$, during the operation of cleaning the teeth, which is performed in the same manner as with an ordinary tooth brush. When the operation of cleaning the teeth is completed, the pad, B, is removed from the socket, $a$, and discarded, a fresh pad being inserted for each cleaning. In this manner the accumulation of filth, which as is well known takes place in the ordinary tooth brush, and the consequent introduction of disease germs in the mouth, is prevented, and an absolutely sanitary means of cleaning the teeth is provided.

I term my improved pad a "destructible" pad as indicating that it is destroyed in the using and is not intended to be used more than once.

I am aware that it has been proposed to employ elastic tooth cleaning pads of felt of various kinds, and this I do not claim. Such pads, however, are composed of long fibers not in themselves absorbent but retaining moisture by adhesion or capillary action. My improved paper pad is solid and is composed of short vegetable fibers each of which is in itself absorbent, so that when the pad is moistened the fibers swell increasing the bulk of the pad, and causing it to fit very tightly and rigidly in the handle socket, and moreover any particles which may be disintegrated by the use of the pad may be easily rinsed or washed away from the teeth and discharged from the mouth, instead of catching between the teeth, as would be the case with the long felt fibers.

What I claim as new and desire to secure by Letters Patent is:

1. The herein described tooth cleaning device consisting of a solid non-elastic pad provided with an operative tooth engaging face, said pad being composed of short mutually adhering porous fibers of paper stock, whereby any portions of the pad which are disintegrated in the mouth when the pad is used are easily washed away and will not become entangled in the teeth.

2. A destructible tooth cleaning pad composed of dry absorbent paper and having tooth engaging projecting portions upon its operative face, said face being provided with a protecting coating of dried tooth cleaning paste filling the interstices between the projecting portions of said face whereby said projecting portions are reinforced against disintegration.

3. A tooth cleaning device comprising a handle provided with a pad holding socket having opposed rigid walls, and a removable solid non-elastic destructible pad, said pad being formed of such size and shape as to be easily inserted between the walls of said socket when dry, said pad being composed of dry absorbent material capable of swelling when moistened, whereby said pad will be clamped rigidly in said socket when moistened.

In testimony whereof, I have hereunto subscribed my name, this 3d day of October, A. D. 1910.

GUSTAF LIBERT REENSTIERNA.

Witnesses:
WILLIAM J. KINDGEN,
CLARKSON A. COLLINS.